(12) United States Patent
Mellitz

(10) Patent No.: US 6,421,391 B1
(45) Date of Patent: Jul. 16, 2002

(54) TRANSMISSION LINE FOR HIGH-FREQUENCY CLOCK

(75) Inventor: Richard I. Mellitz, Irmo, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/935,909

(22) Filed: Sep. 22, 1997

(51) Int. Cl.⁷ ............................................... H04B 3/00
(52) U.S. Cl. ...................................................... 375/257
(58) Field of Search ................................. 375/257, 354, 375/229; 333/18, 28 R

(56) References Cited

U.S. PATENT DOCUMENTS

| | | | | |
|---|---|---|---|---|
| 4,388,725 A | * | 6/1983 | Saito et al. ................. | 375/257 |
| 5,086,500 A | | 2/1992 | Greub ......................... | 395/550 |
| 5,243,703 A | | 9/1993 | Farmwald et al. .......... | 395/325 |
| 5,274,677 A | | 12/1993 | Ohuchi et al. ............... | 375/107 |
| 5,361,277 A | * | 11/1994 | Grover ......................... | 375/354 |
| 5,517,532 A | | 5/1996 | Reymond ..................... | 375/354 |
| 5,539,333 A | * | 7/1996 | Cao et al. ...................... | 326/63 |
| 5,548,734 A | | 8/1996 | Kolinski et al. ............. | 395/306 |
| 5,594,376 A | * | 1/1997 | McBride et al. ............. | 327/236 |
| 5,640,112 A | | 6/1997 | Goto et al. ................... | 327/141 |
| 5,661,427 A | * | 8/1997 | McBride et al. ............. | 327/236 |
| 5,675,584 A | * | 10/1997 | Jeong .......................... | 327/407 |
| 5,770,950 A | * | 6/1998 | Zurcher et al. ............... | 326/30 |
| 5,953,521 A | * | 9/1999 | Dabral et al. ................ | 395/552 |

* cited by examiner

Primary Examiner—Tesfaldet Bocure
(74) Attorney, Agent, or Firm—Greg Welte

(57) ABSTRACT

A transmission line for a clock input for a digital device. In the prior art, a clock signal was fed to a digital device on a transmission line. It was found that, when the clock frequency was doubled, the clock pulses received by the device became unacceptable. The invention lengthened the transmission line, rather than shortening it, and thereby removed the unacceptable features of the clock pulses.

14 Claims, 17 Drawing Sheets

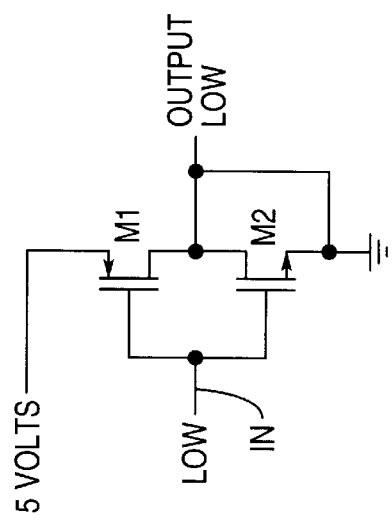
FIG. 19A
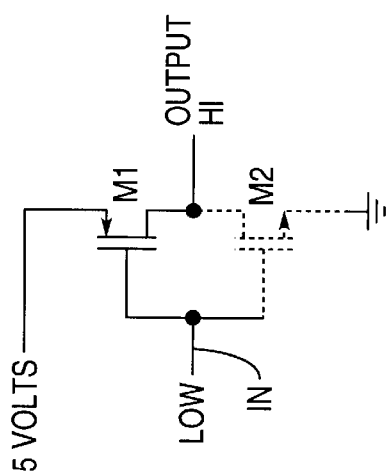
FIG. 19B
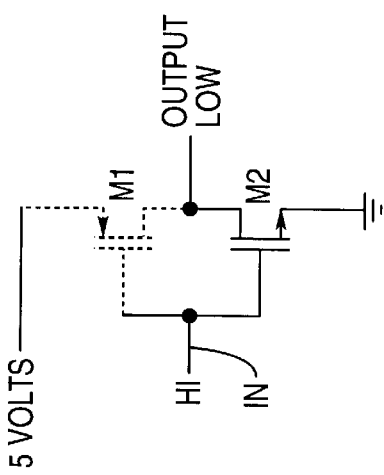
FIG. 19C
FIG. 19

TRANSMISSION LINE FOR HIGH-FREQUENCY CLOCK

The invention concerns a transmission line for delivery of high-frequency clock signals.

BACKGROUND OF THE INVENTION

FIG. 1 illustrates a clock 3 which feeds a clock signal to a transmission line 6, which may take the form of a trace on a printed circuit board (not shown). The trace 6 leads to a clocked device 9, which uses the clock signal as an input.

At low clock frequencies, the apparatus shown encounters no significant problems. For example, when the line 6 is 15.12 inches long, and the clock runs at 33 MHz, clock signal 12 delivered to the clocked device 9 was found to be acceptable, as indicated.

However, if the clock frequency is increased, problems can be encountered. For example, if the clock signal is increased to 66 MHz, as in FIG. 2, then the clock signal 16, measured at the input 17 of device 9A, was found to be unacceptable, as indicated. FIG. 3 illustrates specific defects found in the clock signal.

When the clock signal was supposed to be LOW, as in region 18 in FIG. 3, it failed to remain below the upper limit 20 of the LOW region, as excursions 23 and 26 indicate. When the clock signal was supposed to be HIGH, as in region 29, it failed to remain above the lower limit 33 of the HIGH region, as excursions 36 and 39 indicate.

These defects render the clock signal 16 unacceptable for many purposes.

OBJECTS OF THE INVENTION

An object of the invention is to provide an improved clock signal in a digital system.

SUMMARY OF THE INVENTION

In one form of the invention, the transmission line carrying the clock signals is lengthened, in order to cause the reflected impedance of the clocked device, seen by the clock, to be both high and capacitive. For a clocked device having an input capacitance of about 5 to 20 pico-Farads, a line length of about ½ wavelength of the clock pulses provides satisfactory results.

BRIEF DESCRIPTION OF THE DRAWINGS

FIGS. 19A, B, and C illustrate an output stage of a hypothetical clock.

DETAILED DESCRIPTION OF THE INVENTION

Overview

Figure 4:
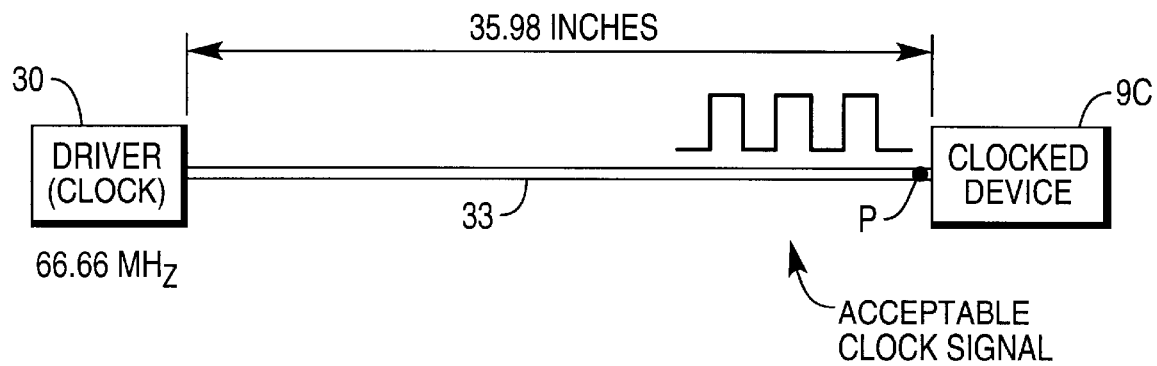
FIG. 4 illustrates one form of the invention.
Figure 6:
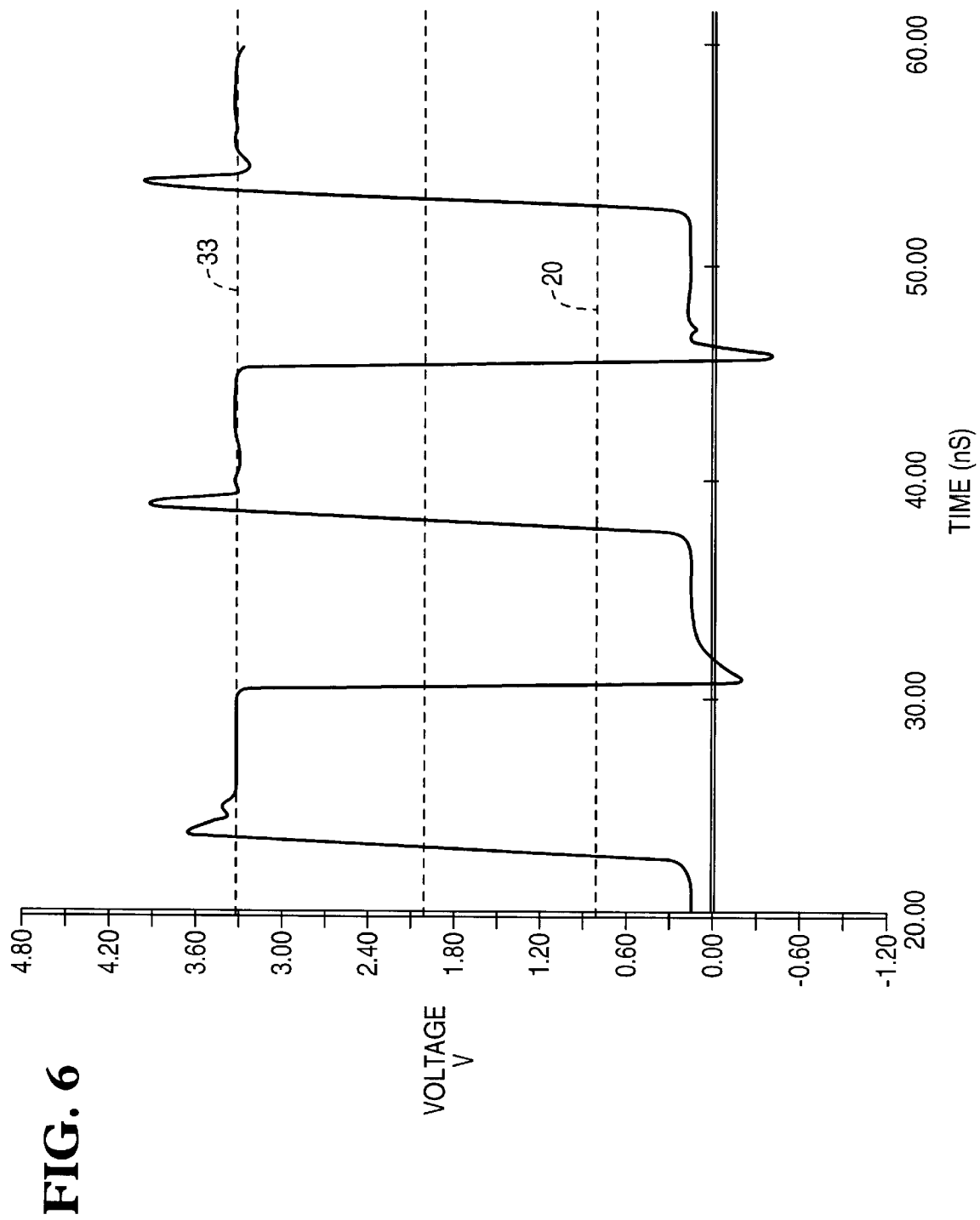
FIG. 6 is a schematic illustration of a clock signal received at point P in FIG. 4.

FIG. 4 illustrates one form of the invention. A clock 30, running at 66.66 MHz, feeds a transmission line 33. The transmission line 33 is 35.98 inches long, which is more than double the length of the line 6 used in FIG. 2. The clock signals 39 received at point P were found to be acceptable, and are illustrated in FIG. 6.

The improvement in clock signals is believed to be caused by lengthening the transmission line. The length chosen causes the impedance seen by the clock 30 to be high, and also capacitive. For the device of FIG. 4, the length is about one-half the wavelength of the clock signal, which is computed as follows.

Figure 5:
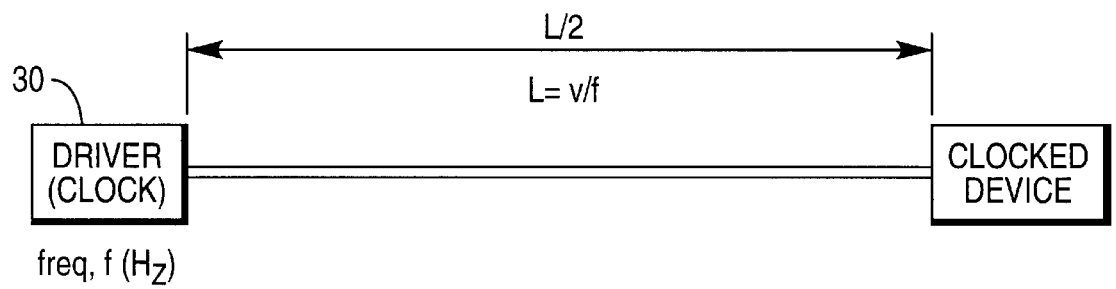
FIG. 5 defines wavelength.

As indicated in FIG. 5, wavelength, L, is given by the expression $$L \text{ meters/cycle} = (v \text{ meters/sec})/(f \text{ cycles/sec}) = v/f$$

The propagation velocity in the transmission line, v, is roughly forty-five percent the speed of light, which itself is $3.0 \times 10^8$ meters/second. Thus, the 33 MHz clock signal has a wavelength of about 2.0 meters:

$$0.45 \times 3 \times 10^8 / 66 \times 10^6 = 2.0 \text{ meters}$$

2.0 meters equals about 6.2 feet. One-half of this wavelength is about 3.1 feet, which is approximately the length of the 35.98-inch transmission line shown in FIG. 4.

Description in Greater Detail

No simple, comprehensive, explanation is readily apparent to explain why the lengthened transmission line 33 in FIG. 4 improves the clock signal detected at point P. However, two plausible hypotheses are the following:

1. At 66 MHz, the transmission line 6 in FIG. 2 may present an impedance of zero to the clock 30. Thus, the clock 30 attempts to drive a short circuit. In so doing, the clock 30 begins to operate outside the linear region for which it was designed, and produces the spikes indicated in FIG. 3.

Increasing the transmission line to a proper length raises the impedance seen by the clock 30, and may return the clock 30 to its linear design-region.

2. At 66 MHz, the transmission line 6 in FIG. 2 may have inductive properties. Capacitors are present elsewhere in the system. Inductor-capacitor combinations are known to "ring" under certain circumstances. The excursions in FIG. 3 may represent ringing behavior.

Increasing the transmission line to a proper length can change the inductive properties to capacitive properties, and possibly eliminate the ringing.

These hypotheses will be discussed below, but an understanding of "reflected impedance" must first be established.

Reflected Impedance

Figure 6A:
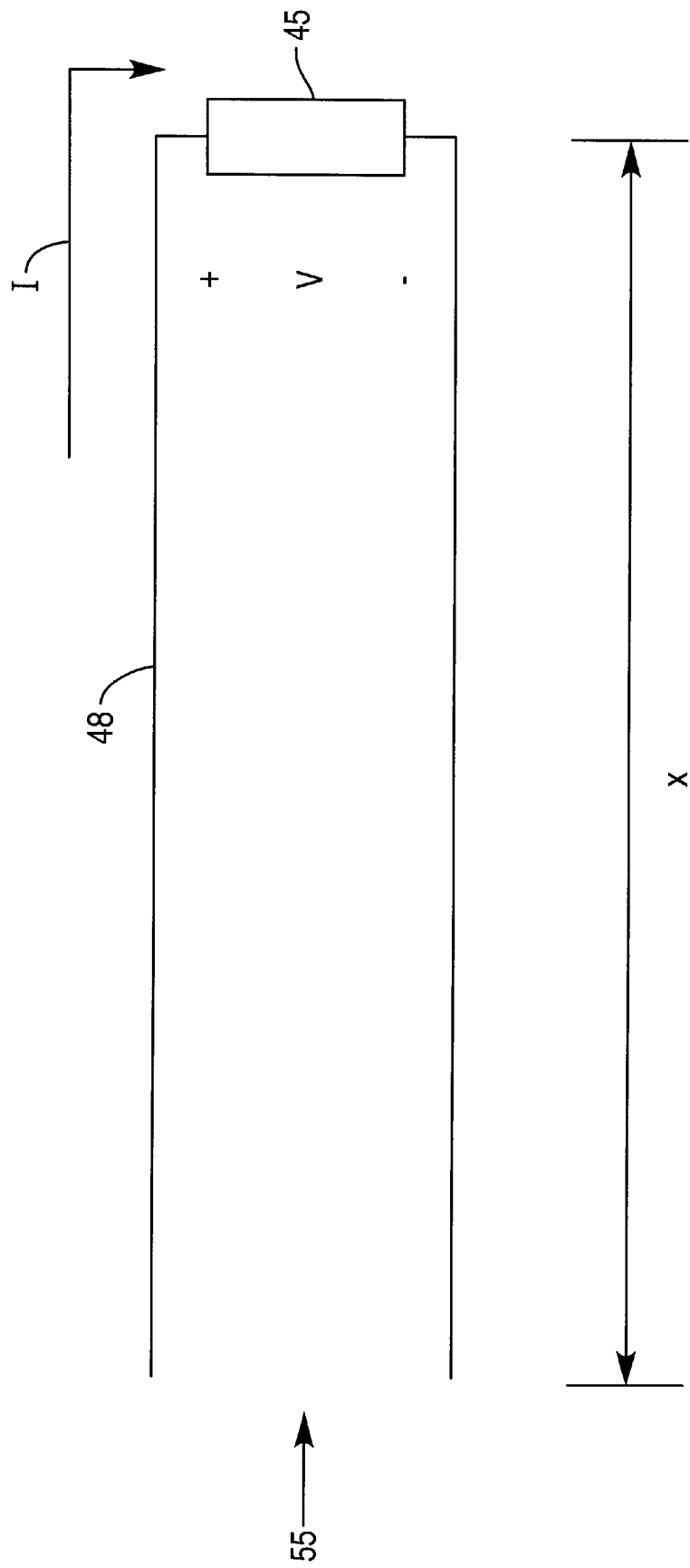
FIG. 6A illustrates a transmission line and a load.

FIG. 6A shows a generalized load 45 on a transmission line 48. The load 45 can represent the clocked device 9A of FIG. 2. The load 45 has an impedance, Z, which is a complex number in general, and is the ratio of the voltage, V, to the current, I:

$$Z = V/I.$$

This impedance is not the "reflected impedance" mentioned above, but is the lumped impedance of the load 45 itself. However, when the load 45 is connected to transmission line 48, and the end 55 of the transmission line 48 is connected to the clock, the clock sees an impedance at end 55 which is a non-linear combination of the load's lumped impedance, plus the transmission line's characteristic impedance.

This impedance, seen at end 55, is the reflected impedance. The reflected impedance depends on the length of transmission line 48, and will change if that length changes. For a lossless line, which is assumed to contain no resistance, the reflected impedance is given by Equation (1):

$$Z(-x) = Z_0 \frac{Z_L \cos(\beta x) + jZ_0 \sin(\beta x)}{Z_0 \cos(\beta x) + jZ_L \sin(\beta x)} \quad (1)$$

wherein

Z is the reflected impedance, and is complex;

x is negative distance from the load, as indicated in FIG. 6;

Beta, $\beta$, is the propagation constant, in radians per meter;

$Z_0$ is the characteristic impedance of transmission line;

$Z_L$ is the impedance of the load; and j is the imaginary operator.

This expression is derived in numerous textbooks on electromagnetic wave propagation, including *Electromagnetic Fields and Waves*, by Magdy Iskander (Prentice-Hall, 1992), ISBN 0-13-249442-6, chapter 7. This book is hereby incorporated by reference in its entirety.

Equation (1) is somewhat complex, and some of its features will be illustrated through examples.

EXAMPLE 1

Assume that the load is an open circuit, wherein $Z_L$ equals infinity. Under this assumption, equation (1) reduces to $$Z(-z) = -jZ_0 \cot(\beta x) \quad (2)$$

Figure 7:
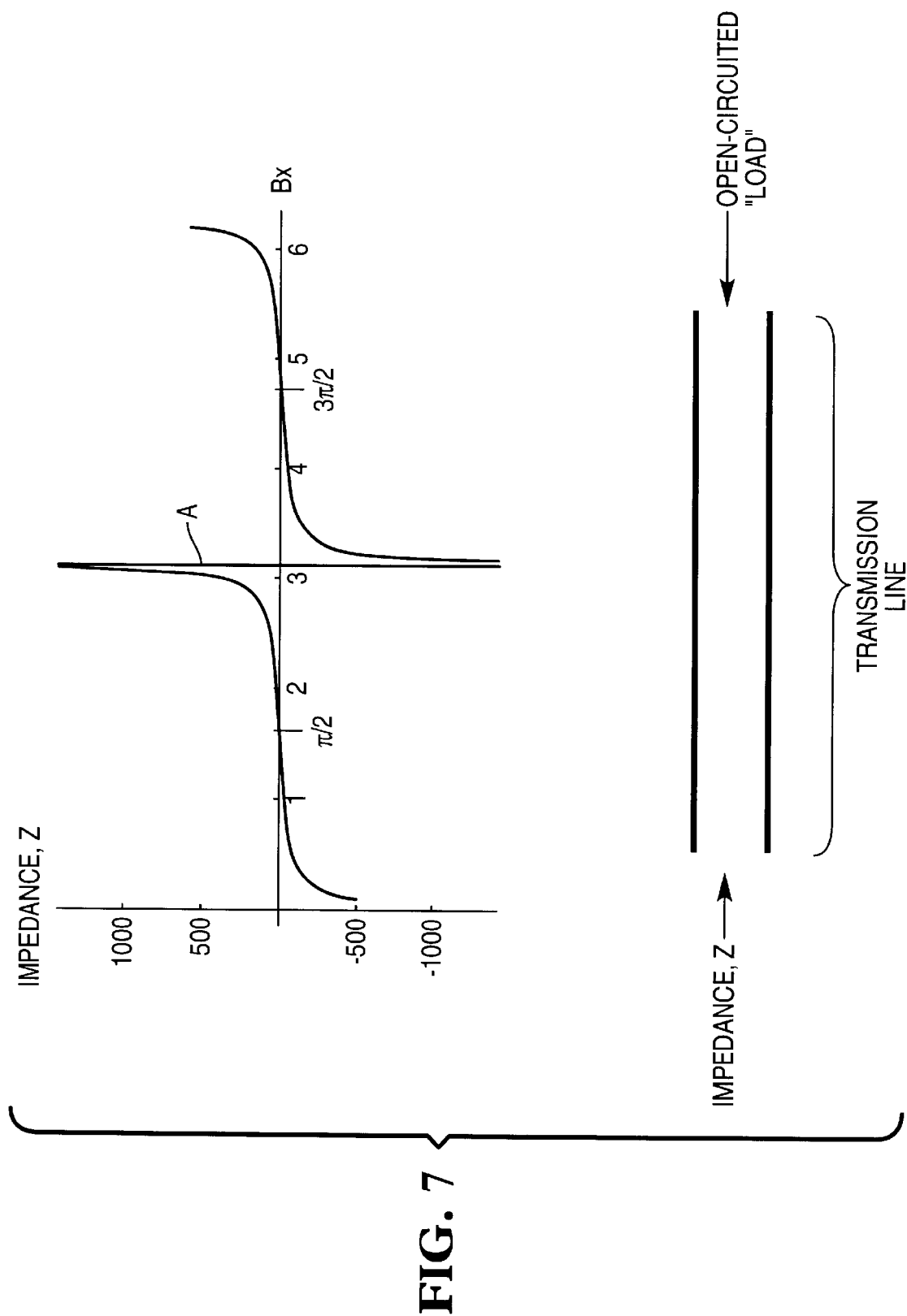
FIG. 7 illustrates reflected impedance for an open-circuited transmission line.

FIG. 7 is a plot of equation (2). (FIG. 7, and other FIGS. herein, were generated by the software package MATHEMATICA, available from Wolfram Research, Inc., Champaign, Ill. The computer code used is given in the FIGS., to assist the reader in duplicating the results, if desired.)

Several features of FIG. 7 are significant. One is that the reflected impedance, Z, is purely imaginary. This is a result of the assumption that the line is lossless, and that the load contains no resistance.

A second feature is that the impedance, Z, is positive in certain regions. A positive imaginary impedance represents an inductive load. For example, the impedance of a purely inductive load is given by the expression jwL, wherein j is the imaginary operator, w is frequency, and L is the size of the inductance. This impedance is positive, and purely imaginary.

A third feature is that the impedance is negative in other regions. A negative imaginary impedance represents a capacitive load. For example, the impedance of a purely capacitive load is given by the expression 1/jwC, wherein j is the imaginary operator, w is frequency, and C is the size of the capacitance. This impedance equals -j/wC, which is negative.

A fourth feature is that the transition from inductive to capacitive loading, and capacitive to inductive loading, occurs at asymptote A.

A fifth feature is that the magnitude of the reflected impedance depends on the length of the transmission line. For example, the magnitude at the point Bx=1.0 is different from the magnitude at the point Bx=3.0.

A sixth feature is that the reflected impedance at the quarter-wavelength point, Π/2, is zero. The point of zero impedance is believed to be particularly significant, and will be elaborated shortly.

EXAMPLE 2

Figure 8:
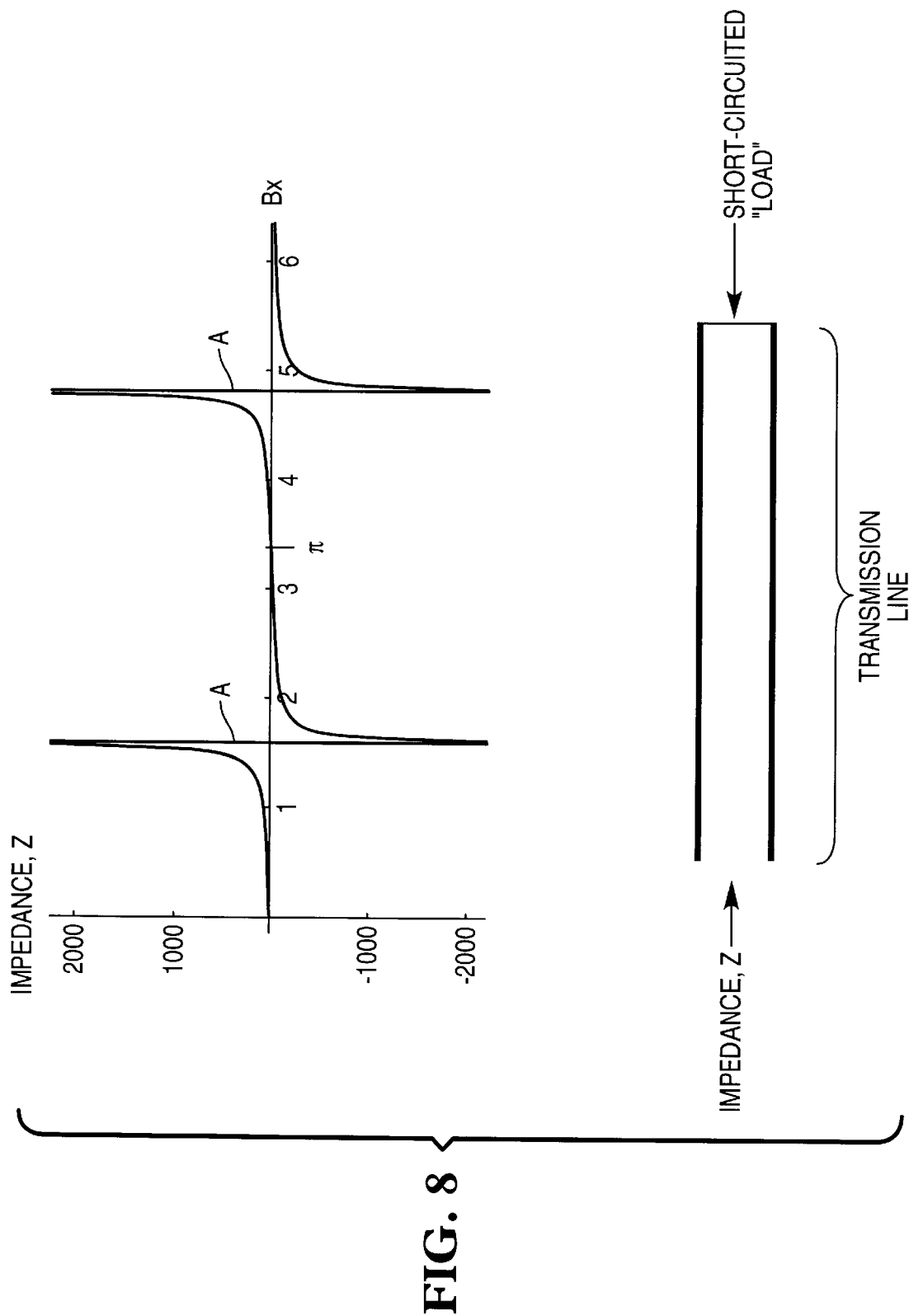
FIG. 8 illustrates reflected impedance for a short-circuited transmission line.

FIG. 8 is a plot of Equation (1), but under the condition that the load $Z_L$ is a short circuit, wherein $Z_L$=0. The first five features discussed above are also present in FIG. 8. As to the sixth feature, in FIG. 8, zero impedance occurs at a half-wavelength point, Π, rather than at the quarter-wavelength point, Π/2, as in FIG. 7.

Therefore, FIGS. 7 and 8 illustrate basic features of reflected impedance, including these three, which are particularly significant in the present context: (1) points exist where the reflected impedance is zero, (2) the positions of the zero-impedance points depend on the type of load, and (3) points exist where the reflected impedance is high.

EXAMPLE 3

Figure 2:
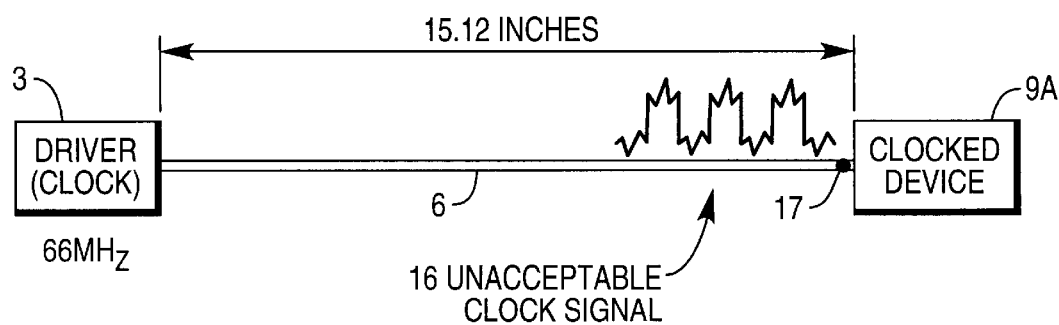
FIG. 2 illustrates that the apparatus of FIG. 1 does not perform acceptably at a clock frequency of 66 MHz.
Figure 3:
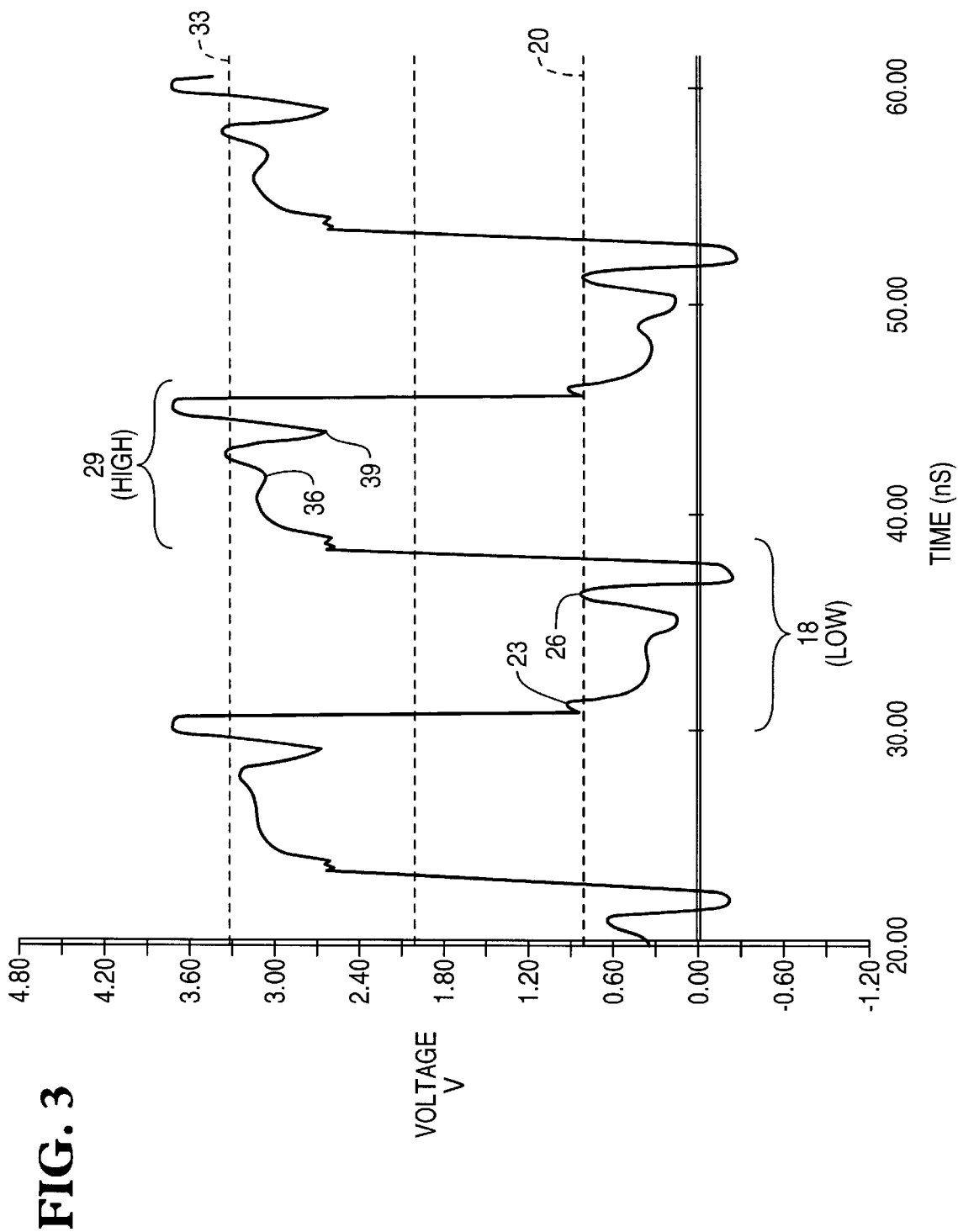
FIG. 3 is a schematic illustration of defects found in the clock signal of FIG. 2.
Figure 9:
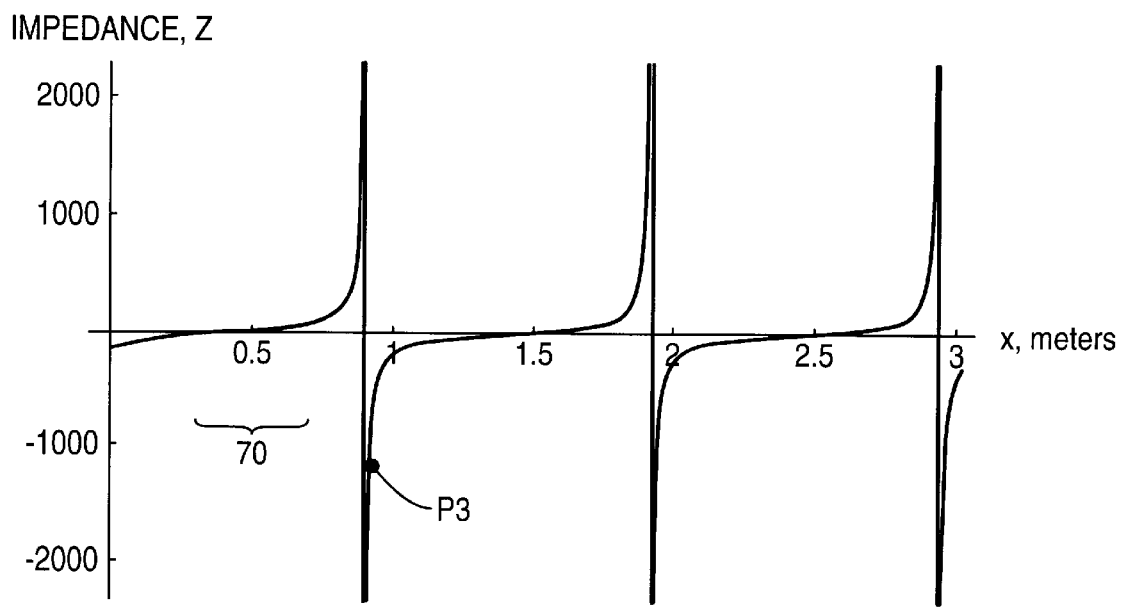
FIG. 9 illustrates reflected impedance for the system of FIG. 4.

Against the previous two Examples as background, this Example will compute the reflected impedance for the situation of FIG. 2. The input capacitance of the load 9A is about 16 pico-Farads, and the input resistance is considered to be infinite. FIG. 9 is a plot of Equation (1), for this load.

As indicated in FIG. 9, the following parameters were assumed:

c: signal propagation velocity, 0.45 of vacuum-speed of light;

cap: capacitance of load, 16 pF;

w: radian frequency, radians/sec;

fr: Hertzian frequency, Hz;

B: propagation constant, radians/meter;

Zo: characteristic impedance of transmission line, assumed 60 ohms;

Zl: load impedance,=1/j*w*cap, for capacitive load; and x: length of transmission line, meters.

Figure 10:
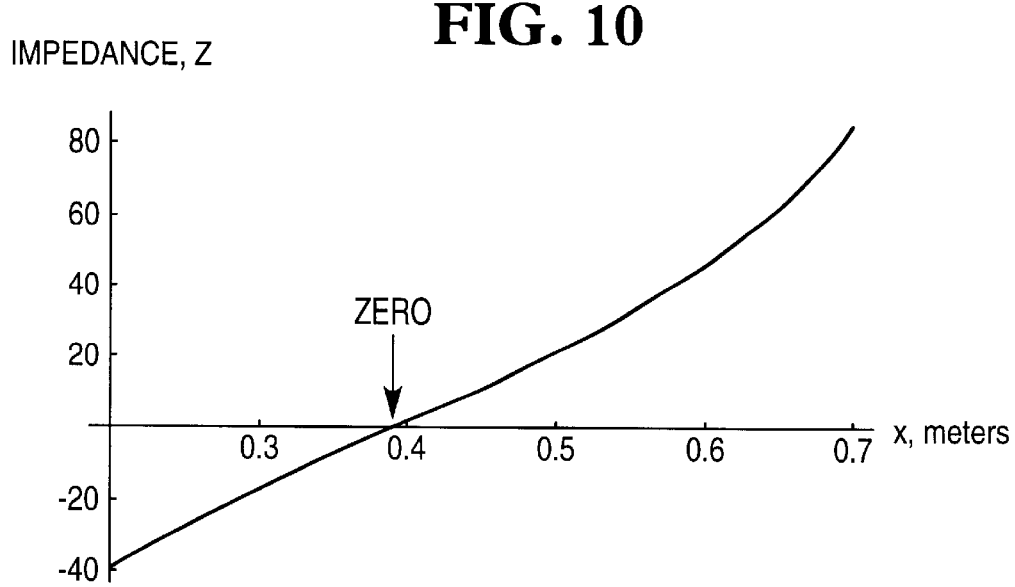
FIG. 10 is an enlargement of region 70 of FIG. 9.

A significant feature of FIG. 9 lies in region 70, which is shown enlarged in FIG. 10. The reflected impedance, Z, reaches zero at about 0.39 meters. This is approximately the length of the transmission line 6 in FIG. 2.

Thus, the reflected impedance of the clocked device 9A in FIG. 2 could be zero. (The value of zero is treated as a possibility, rather than a certainty, because the plot of FIG. 10 is an approximation. It was computed based on assumed values of propagation velocity, input capacitance, etc. These assumed values may be slightly incorrect. Further, these values can change over time. Therefore, FIG. 10 is taken as an approximation.)

If the reflected impedance is zero, the clock 3 would then see a zero-impedance load. As stated above, such a load can perhaps cause the clock to enter a non-linear region of operation, and cause erratic behavior.

Alternately, the reflected impedance may not be zero, but the curve of FIG. 10 may actually lie slightly to its left, making the reflected impedance inductive at 0.39 meters. This inductive impedance may induce ringing, as explained above.

Therefore, at 66 MHz, the reflected impedance of the 16-pF load is near a zero point, and may be inductive. Both cases are considered undesirable.

Figure 1:
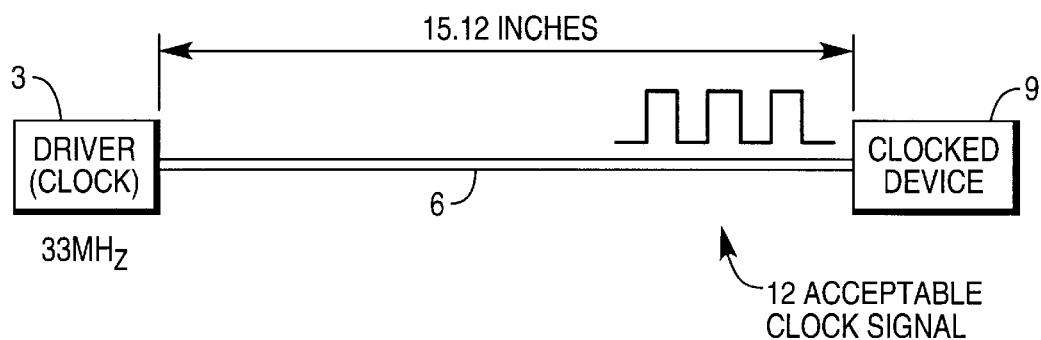
FIG. 1 illustrates a situation found in the prior art, wherein a clock signal at 33 MHz is carried by a 15-inch line to a clocked device.
Figure 11:
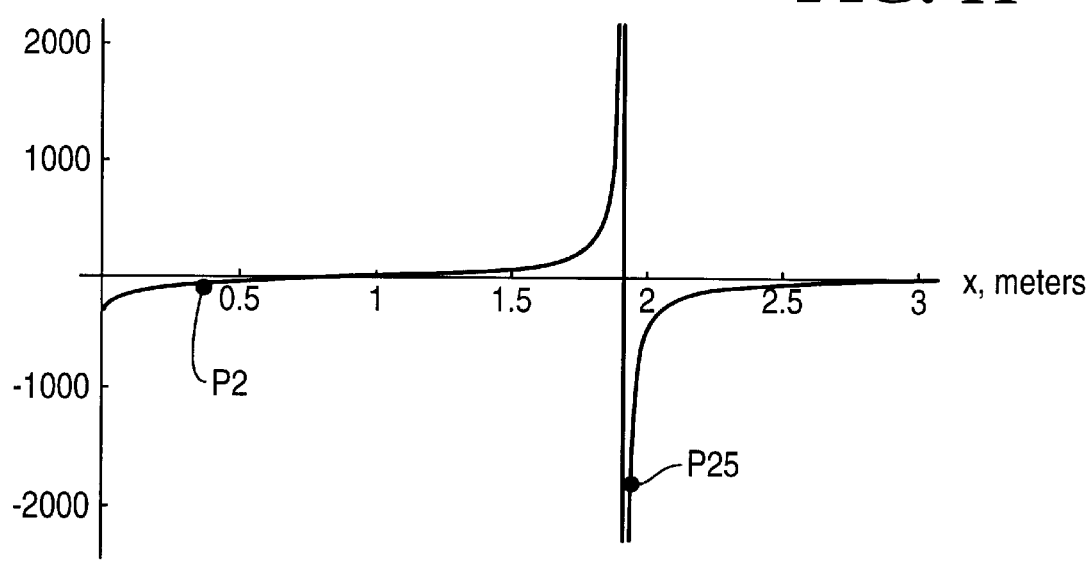
FIG. 11 illustrates reflected impedance for the system of FIG. 1.

It is observed that these problems do not arise in the 33-MHz clock of FIG. 1. FIG. 11 is a plot of the reflected impedance of the clocked device 9, at 33 MHz. As FIG. 11 indicates, the zero-impedance point lies at a line length of about one meter. But, since the transmission line is about 15 inches long, or about 0.4 meter, the apparatus is operating at point P2. At point P2, the reflected impedance is not zero, but is finite, and is not inductive, but capacitive. The two hypotheses stated above do not apply to FIG. 1.

Figure 12:
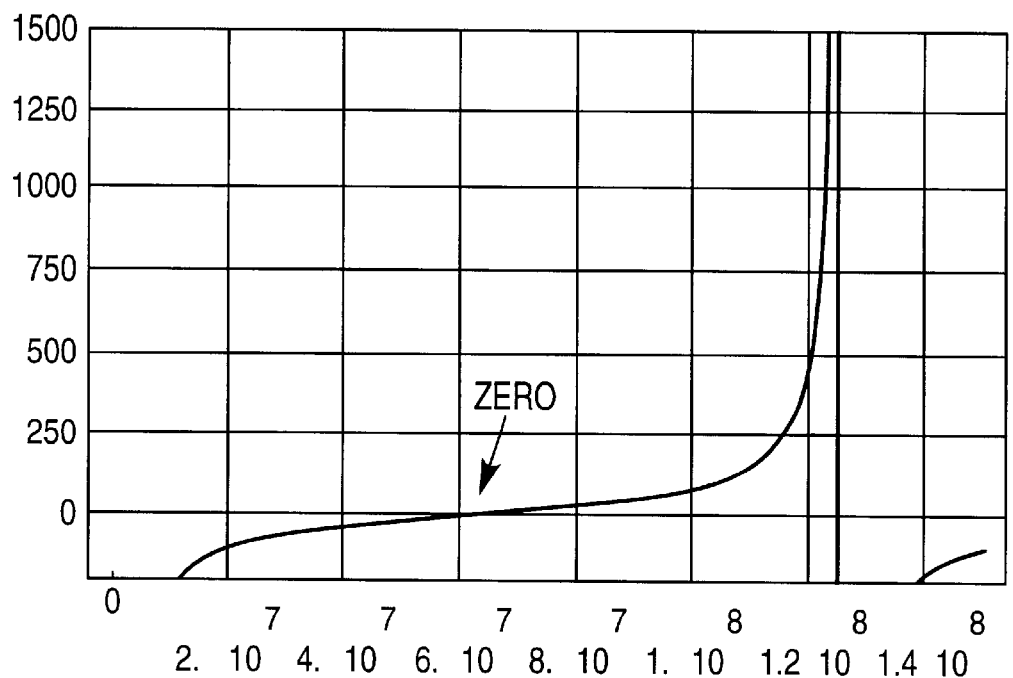
FIG. 12 illustrates reflected impedance, for different frequencies, for the system of FIG. 4, for a transmission line of 0.38 meters in length.

FIG. 12 analyzes the situation of FIG. 2 from another perspective. FIG. 12 is a plot of reflected impedance, as a function of frequency, for a constant line length of 15 inches (0.38 meter). (In contrast, FIG. 9 plotted reflected impedance at a constant frequency, for different line lengths.) FIG. 12 indicates that, at about 66 MHz, the reflected impedance may be either zero, or inductive, consistent with the conclusions based on FIGS. 9 and 10.

Figure 13:
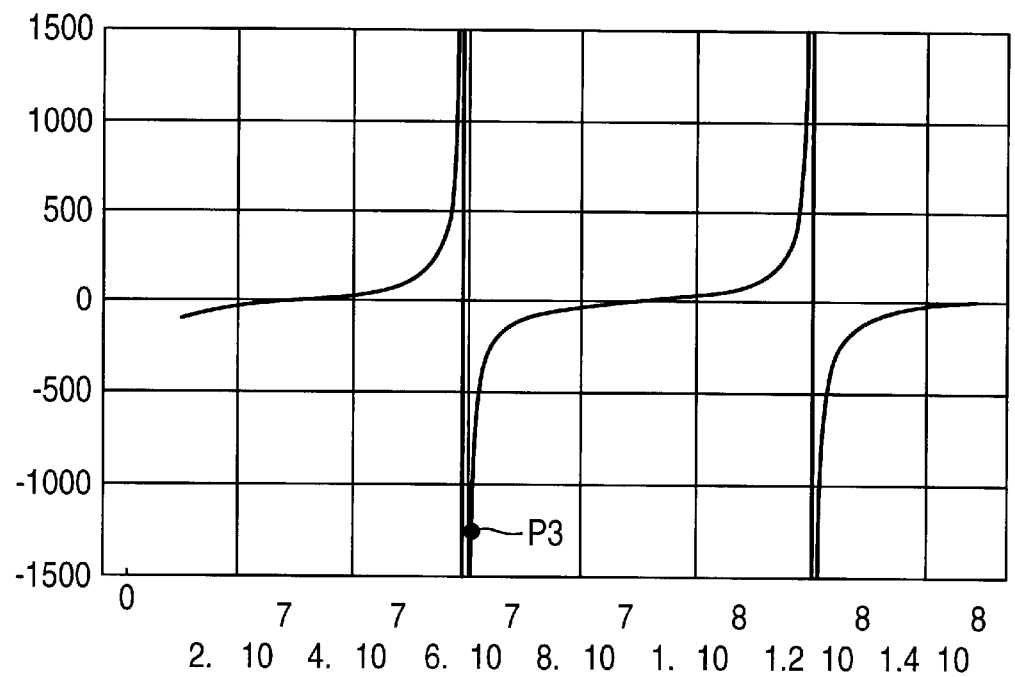
FIG. 13 illustrates reflected impedance, for different frequencies, for the system of FIG. 4, for a transmission line of 0.9 meters in length.

FIG. 13 is a plot of the reflected impedance for the invention of FIG. 4, which uses a line of 0.9 meters. At 66 MHz, the reflected impedance is capacitive, as indicated by point P3. The problem of a zero, or inductive, reflected impedance is eliminated.

Therefore, in one form of the invention, a length of transmission line is chosen, based on Equation (1), which causes the reflected impedance, seen by the clock 3, to be capacitive. Further, the length is chosen such that the magnitude of the reflected impedance is equal to, or greater than, the magnitude of the input impedance of the clocked device, at the clock frequency.

For example, the 16-pF load of device 9C in FIG. 4 corresponds to $-j150$ ohms at 66 MHz: $Z=1/j*w*cap=1/j*2*PI*66*10^6*16*10^{-12}=-j150$. The length of transmission line is chosen to provide a reflected impedance of this value. Alternately, a line length providing a multiple of this value can be selected.

Half-Wavelength Feature

It was stated above that the transmission line of FIG. 4 is about one-half wavelength long. However, it appears that this half-wavelength feature is coincidental, and is a result of the particular conditions stipulated for FIG. 4. Some other conditions will be considered, which indicate that half-wavelength lines do not provide appropriate reflected impedance at 66 MHz.

Figure 14:
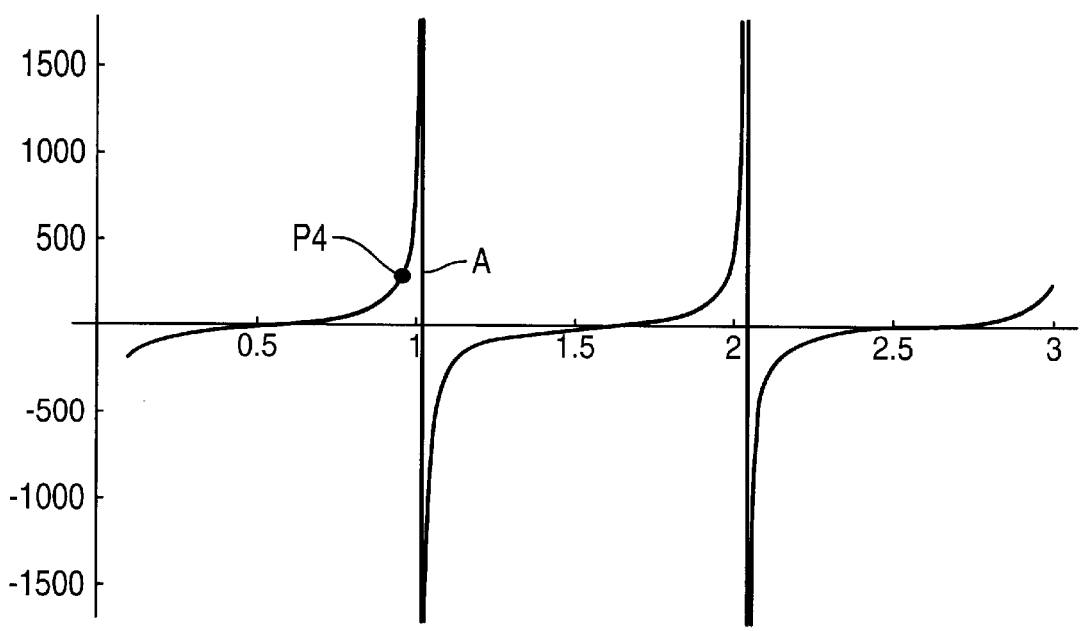
FIGS. 14–16 illustrate reflected impedances for the system of FIG. 4, but for different input capacitances of clocked device 9C.
Figure 15:
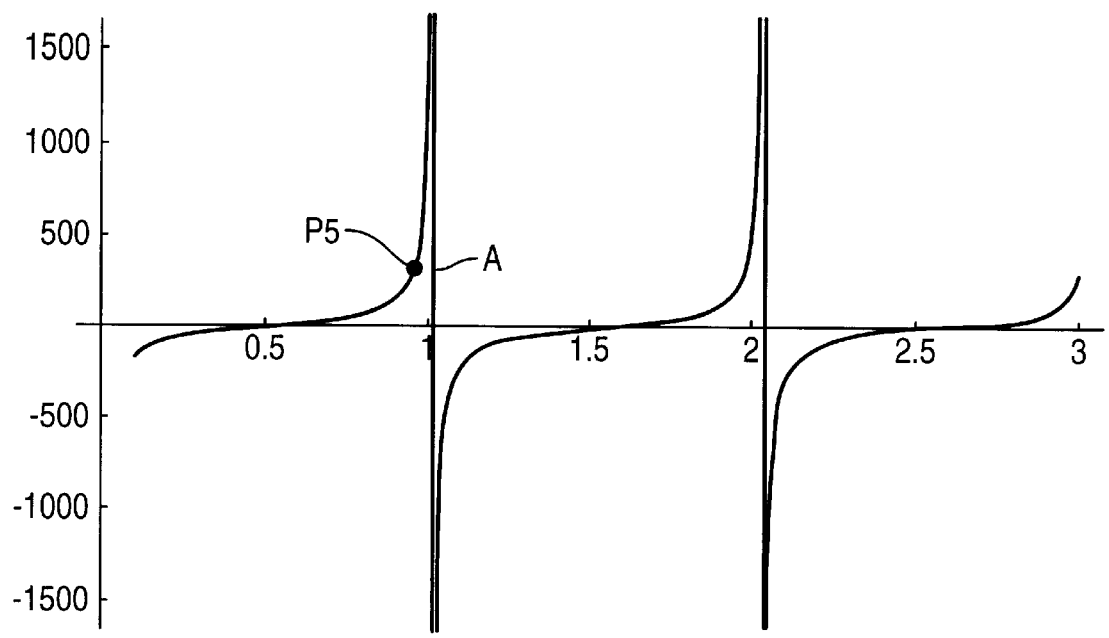
Figure 16:
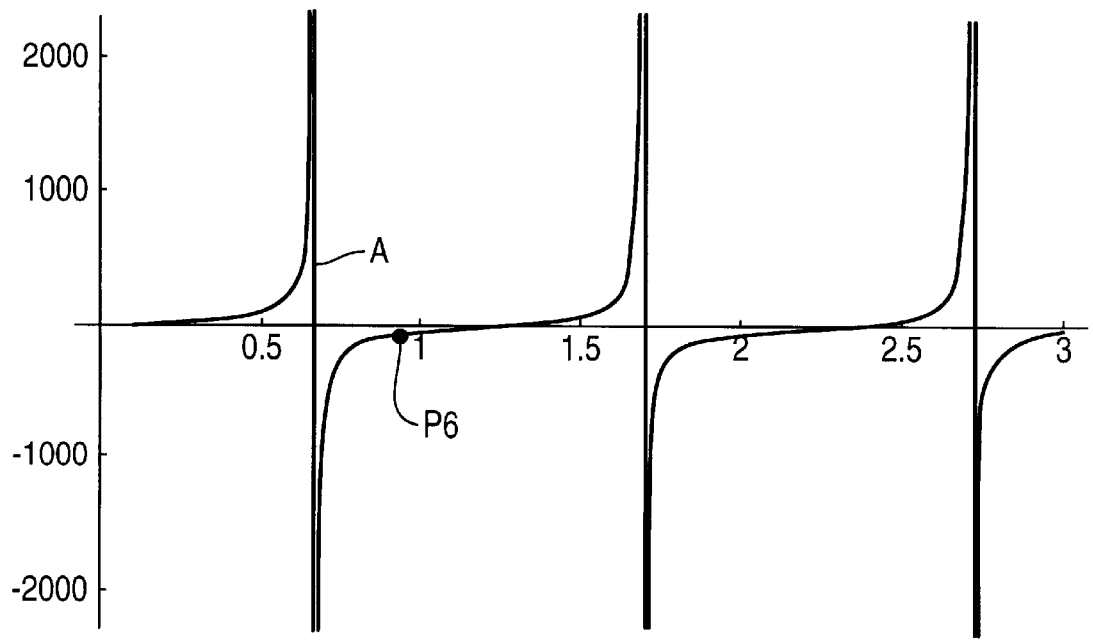

FIG. 9 indicates that the half-wavelength line discussed above presents a reflected impedance of about $-j$ 1400 ohms. FIGS. 14–16 are similar to FIG. 9, but are computed for different input capacitances of the load.

In FIG. 14, the input capacitance is very small, at $10^{-16}$ Farad. A length of 0.95 meters, indicated by point P4, presents a reflected impedance of about $+j$ 250. This reflected impedance is smaller, and inductive, compared with FIG. 9, for the half-wavelength of line.

In FIG. 15, the input capacitance of the load is larger than in FIG. 14, but 1/16 that of FIG. 9, at one pico-Farad. Point P5 indicates the reflected impedance, which is larger than that of FIG. 14, but still smaller than that of FIG. 9, and still inductive.

In FIG. 16, the capacitance is about 5 times that of FIG. 9, at 75 pico-Farads. Point P6 indicates the reflected impedance, which is capacitive, but one or two hundred ohms in size. This impedance is significantly smaller than that of FIG. 9.

Therefore, FIGS. 14–16 indicate that different input capacitances of the load will require lines of different length, for a given frequency.

These conclusions are consistent with the plots of FIGS. 7 and 8, for the reflected impedances of open- and short-circuited transmission lines. The plot of FIG. 8 is basically the same as that of FIG. 7, but shifted to the left by 90 degrees.

Similarly, it appears that FIG. 14 represents the plot for an extremely small, or zero, input capacitance, and that FIG. 16 represents the plot for a large input capacitance. For an actual input capacitance between these values, the relevant plot will lie between these two extremes.

Further Discussion of Reflected Impedance

This discussion will explain certain problems which a zero reflected impedance can create for the clock 3 of FIG. 2.

Assume a transmission line which is terminated by a load, as in FIG. 6A. When a sine wave is projected into the transmission line it reflects at the load. Now, two sine waves exist in the transmission line: one travelling toward the load, and the reflected wave travelling away from the load. These two waves create a standing wave in the transmission line.

Equation (3) is a standard equation describing the two waves. $V_1$ is the magnitude of the voltage of the wave travelling toward the load and gamma, $\gamma$, is the propagation constant, which equals $\alpha+j\beta$, wherein $\alpha$ is the attenuation constant, and $\beta$ is the phase constant.

$$V(x)=V_1 e^{-\gamma 1}(e^{\gamma x}+\rho_T e^{-\gamma x}) \tag{3}$$

To plot the standing wave graphically, the reflection coefficient, $\rho$, is re-written as in Equation (4).

$$\rho_T=|\rho_T|e^{(j\phi T)}=e^{[-2(p+jq)]} \tag{4}$$

Equations (5) and (6) are derived from Equation (4). Equation (5) states p in terms of rho, $\rho$. Equation (6) states q in terms of $\phi$.

$$p=\log_e(1/\sqrt{|\rho_T|}) \tag{5}$$

$$q=-(\tfrac{1}{2})\phi_T \tag{6}$$

Substituting Equations (5) and (6) into Equation (3), and re-arranging, produces Equation (7), wherein k is a constant.

$$|V(x)|=k[\sin h^2(\alpha x+p)+\cos^2(\beta d+q)]^{1/2} \quad (7)$$

In a lossless line, the attenuation constant, α, is zero, producing Equation (8).

$$|V(x)|=k[\sin h^2 p+\cos^2(\beta d+q)]^{1/2} \quad (8)$$

Figure 17:
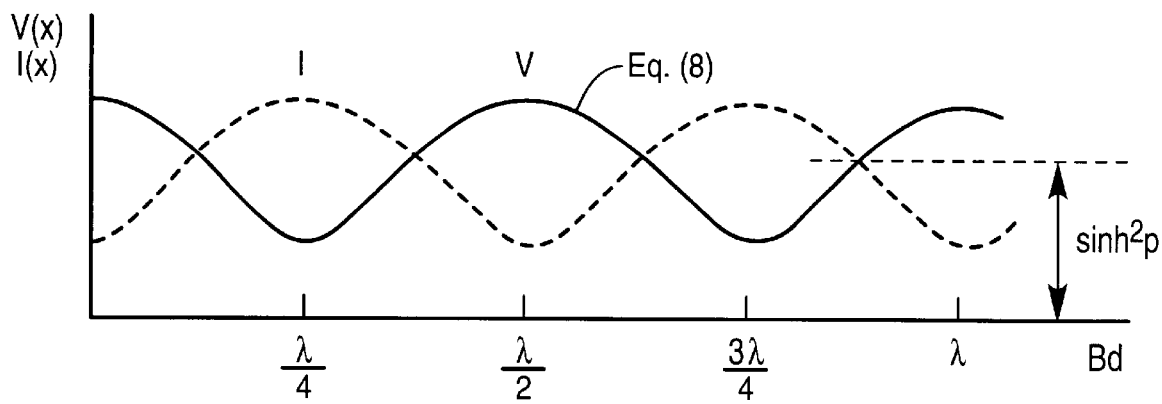
FIG. 17 illustrates standing waves occurring on a transmission line.

FIG. 17 is a plot of Equation (8), in the most general case. The "sinh$^2$" term controls the vertical displacement from the horizontal axis, as indicated. The variable "q" is a phase term, and controls the left-right position of the plot.

FIG. 17 also shows the standing wave of current, I.

Figure 18:
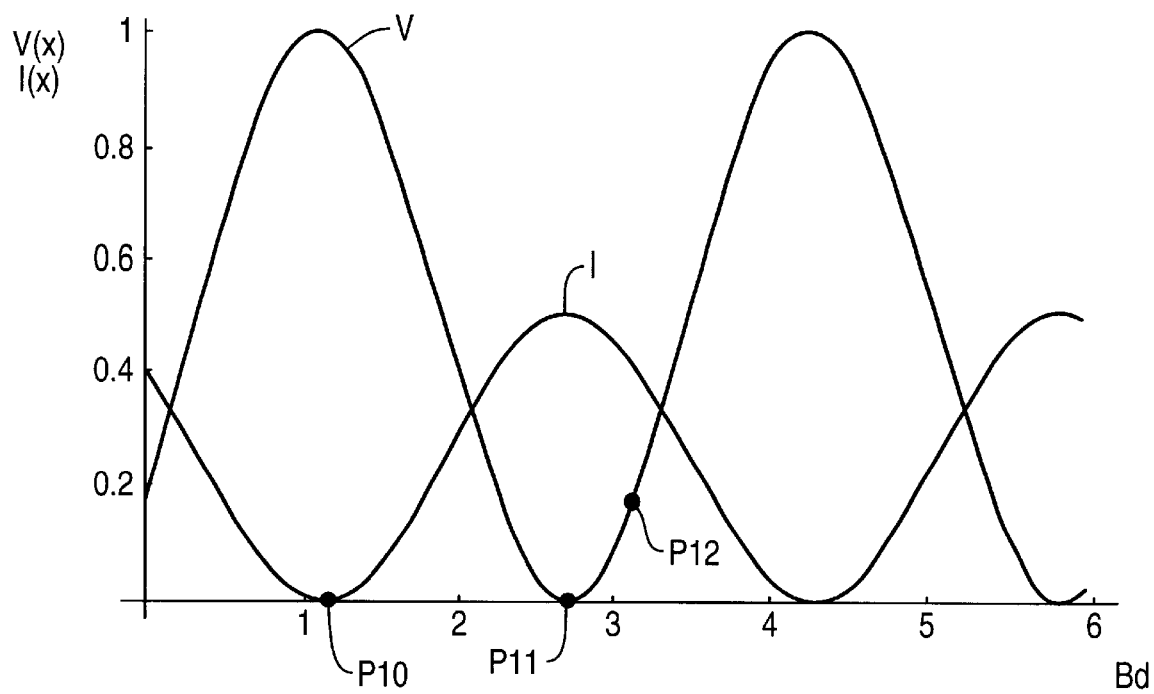
FIG. 18 illustrates a specific type of standing wave occurring on the transmission line of FIG. 4.

FIG. 18 illustrates standing waves wherein the "sinh$^2$" term and "q" are chosen to illustrate problems which a reflected impedance of zero can cause. The reflected impedance is the ratio of the voltage to the current, V/I.

At point P10, the current is zero, causing the reflected impedance to be infinite. At point P11, the voltage is zero, causing the reflected impedance to be zero. At other points, such as point P12, the reflected impedance is a finite number, and depends on the ratio of V to I. It is noted that, in FIG. 17, no points of zero reflected impedance exist.

In terms of FIG. 18, if the clock 3 of FIG. 2 were connected to a zero-impedance point, it would be connected to a point such as point P11. There, the voltage standing wave is always zero: the left- and rightward traveling waves always sum to zero.

The output stage of the clock would be clamped to zero voltage, which can cause problems. For example, assume that the output stage of the clock resembles that of FIG. 19.

Ordinarily, this output stage would operate as follows. When the input IN to the stage is HI, as in FIG. 19A, transistor M2 goes ON and transistor M1 goes OFF. The OUTPUT is pulled LOW. Conversely, when the input IN to the stage is LOW, as in FIG. 19B, transistor M2 goes OFF and transistor M1 goes ON. The OUTPUT is pulled HI.

However, if the OUTPUT is clamped to ground, as indicated in FIG. 19C, transistor M1 may have difficulty in pulling the OUTPUT to a HI value.

In addition to this problem, the standing wave or the current creates its own problem. As FIG. 18 indicates, the current is maximum at zero-impedance point P11.

(It should be recognized that FIG. 18 illustrates the envelope of the magnitude of the current, in the phasor sense. That is, the current periodically rises, then peaks, then collapses to zero, then reverses, then peaks at a negative peak, and continues this cycle. FIG. 18 shows the envelope of the maximum positive value.)

The output stage of clock 3 must conform to this current. That is, the output stage must alternately supply, and sink, the current I in FIG. 18. Further, this must be accomplished while the OUTPUT is clamped to ground. This may be impossible.

Therefore, FIGS. 17–19 illustrate problems which a clock may encounter in driving a line of zero reflected impedance.

One Form of Invention

Figure 20:
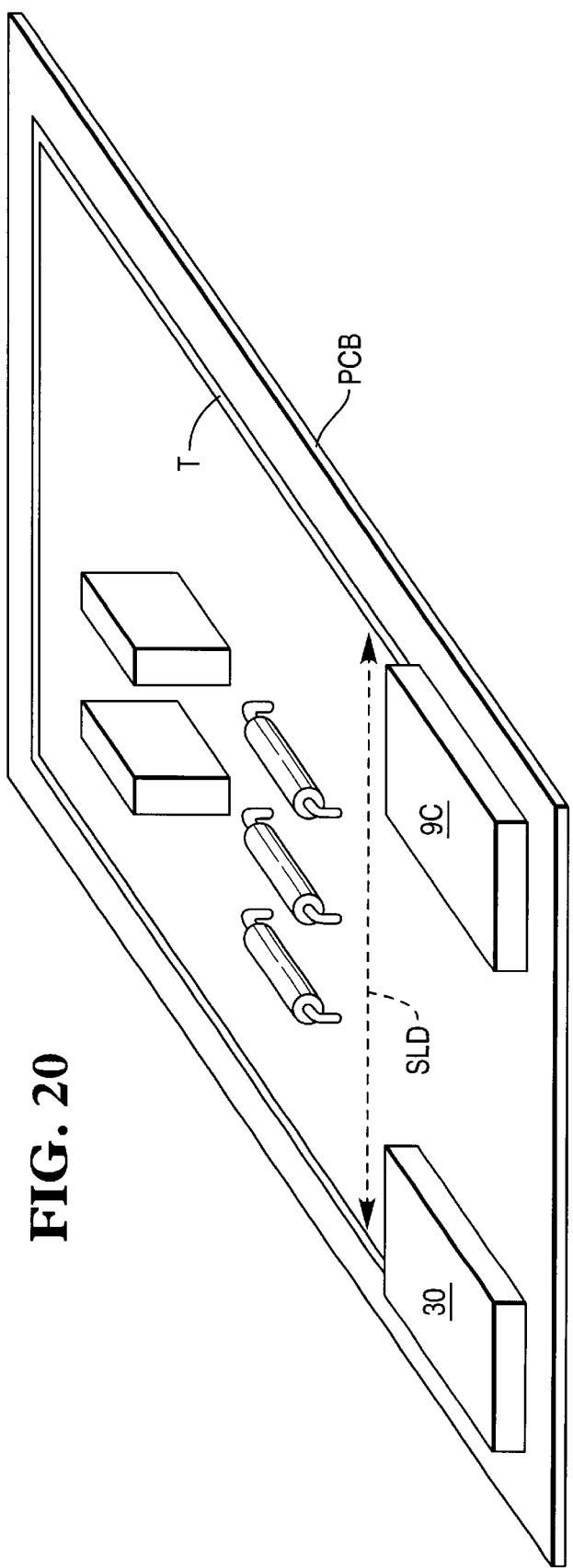
FIGS. 20 and 21 illustrate two forms of the invention.

FIG. 20 illustrates a printed circuit board, PCB. It contains a clock 30 and a clocked device 9C. A trace T carries a clock signal (not shown). The trace T is of a length determined by the present invention. For example, at 66 MHz, the trace is about 36 inches long. In one embodiment, the trace T is at least twice as long as the straight-line-distance, SLD, between the clock 30 and the clocked device 9C.

Figure 21:
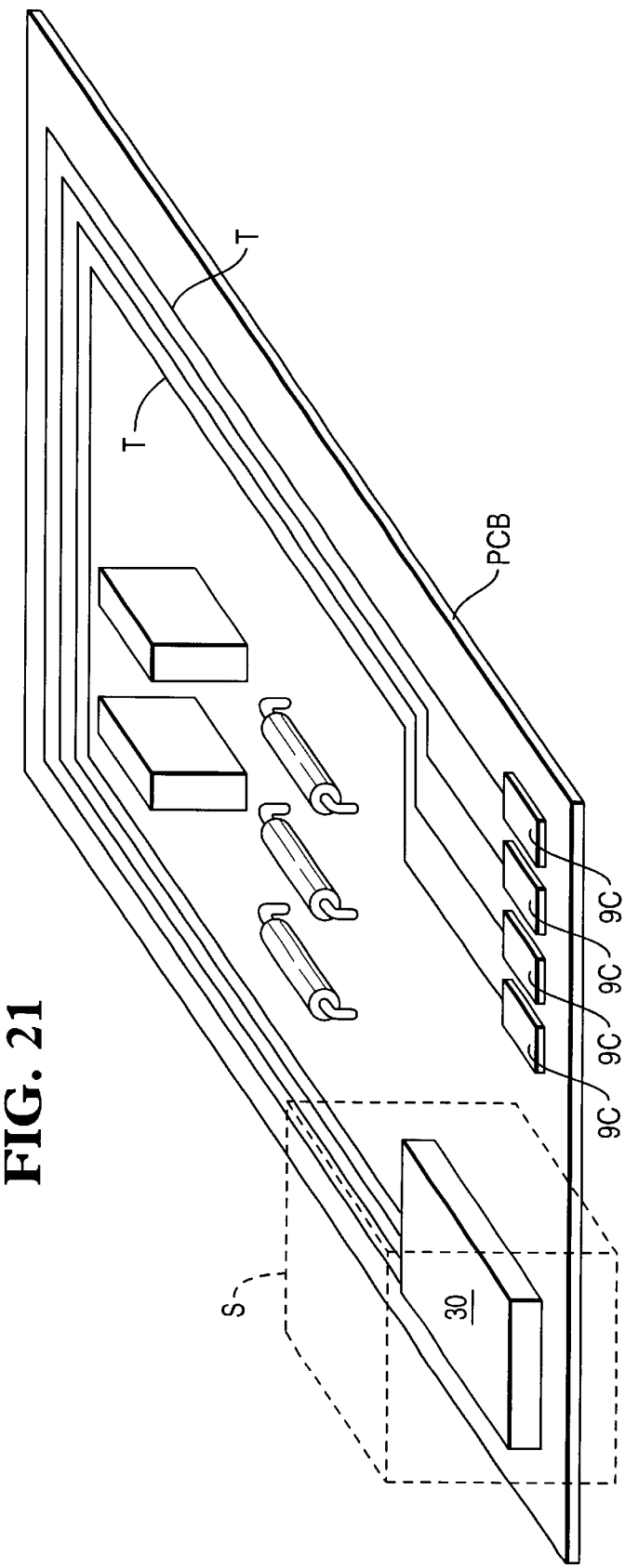

FIG. 21 illustrates a printed circuit board PCB. Multiple clocked devices 9C are shown, clocked by a single clock 30, or a collection of clocks represented by clock 30. Traces T are all substantially the same length, perhaps at 36 inches. Clock 30 is surrounded by electromagnetic shielding S, which can take the form of a copper, or aluminum, box. This arrangement allows the clock 30, or collection of clocks, to be remotely located from the clocked devices 9C. The remote positioning allows the clock 30 to be positioned at a location where space is not at a premium, so that the shielding S does not interfere with other electronic components.

Additional Considerations

1. It was stated above that the reflected impedance can be equal to that of the input impedance of the clocked device. Alternately, a length of line can be selected which causes the reflected impedance to be higher than that of the clocked device. For example, if multiple devices are to be clocked, their input capacitances effectively add in parallel, and present a large capacitance to the clock. If the traces T in FIG. 21 are chosen of length such that the reflected impedance is four times the impedance of each device, then it is possible for a single clock 30 to drive the four devices, through four traces.

In this connection, it is observed that, in the prior-art situation of FIG. 1, the reflected impedance is necessarily less than that of the clocked device. In FIG. 11, in the region to the left of 1.0 meters, the plot monotonically approaches zero. In this region, the maximum value of reflected impedance occurs at a transmission line length of zero. At zero, the reflected impedance equals the lumped impedance of the clocked device.

For the reflected impedance to exceed the lumped impedance, and still remain capacitive, a line length of about 2.0 meters, or 6.2 feet, is required!

2. The invention accommodates drift which occurs in normal operation. For example, the electronic components of the clock 30, such as resistors, capacitors, etc., can change with temperature and age, and cause the clock frequency to drift. Also, the characteristic impedance of the transmission line may change, as can the input capacitance of the clocked device. These factors can cause the plot of FIG. 9 to shift in position.

Figure 22:
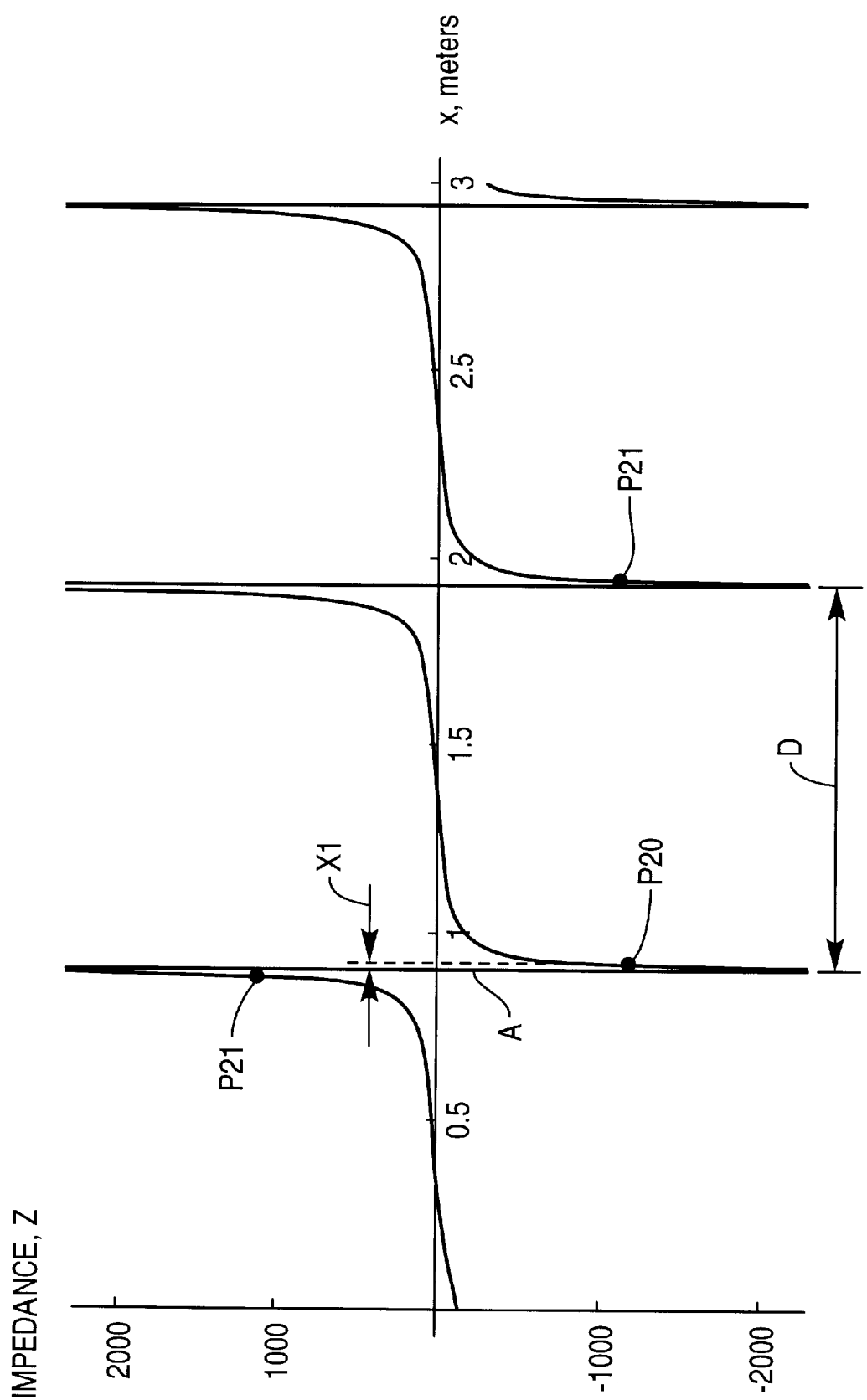
FIG. 22 is a copy of the plot of FIG. 9.

FIG. 22 is a copy of FIG. 9. Assume that point P20 is chosen as the operating point. It is possible that component drift, and other factors, can cause the operating point to, in effect, move to point P21, which is inductive. (Actually, point P20 does not move, but stays at the same position on the horizontal axis, because the physical length of the transmission line does not change. Instead, the plot moves, because the variables of Equation (1) change, to cause the operating point to jump to point P21.)

To combat this drift, point P3 is chosen sufficiently far from the asymptote A to prevent this shift to an inductive impedance.

In one embodiment, a distance x1 is defined in FIG. 22, which is the distance between the operating point and the asymptote A. Distance x1 is chosen such that (B) (x1) exceeds one of the following: 0.1 radian, 0.2 radian, 0.3 radian, 0.4 radian, or 0.5 radian. "B" is the propagation coefficient, Beta, in radians per meter.

From another perspective, if the distance between asymptotes A is D, as indicated, then x1 is chosen to be at least five percent of D.

3. The mathematical analysis given above applied sinusoidal, steady-state analysis to ascertain the reflected impedance of the transmission line. However, a clock signal is a digital signal, and, strictly, the sinusoidal analysis is not applicable. Nevertheless, as FIG. 6 indicates, satisfactory clock signals were obtained.

4. In one embodiment, the invention is restricted to use with a continuous clock signal. That is, the invention is not designed for use with occasionally occurring signals, such as an ENABLE signal. One reason is that, upon start-up of the system, the well-behaved waveforms shown in FIG. 6 are not yet established. The clock signals will have some of the defects of FIG. 3. However, after the first few clock signals, and after certainly no more than ten or twenty signals, the waveform of FIG. 6 becomes established.

An occasional signal, such as the ENABLE signal, will behave like the first few signals, and will not deliver a clean pulse.

5. It is not necessary that the shortest possible transmission line be selected. For example, point P21 in FIG. 22 can be chosen as the operating point.

6. Calculations indicate that, for input capacitances of loads in the range of about 5 to 20 pF, a half-wavelength transmission line is appropriate, for frequencies of 50 MHz and above.

7. The following Tables specify particular line lengths for various frequencies. Table 1 specifies favorable lengths. Table 2 specifies lengths to be avoided.

TABLE 1

Favored Lengths

| Frequency (MHz) | Favored Lengths (Inches) |
|---|---|
| 100 | 22.6, 27.5 |
| 85 | 27.3, 33.0 |
| 75 | 31.6, 37.5 |
| 66 | 36.2, 43.0 |
| 60 | 40.7, 47.0 |
| 33 | 77.4, 88.0 |
| 30 | 86.5, 97.0 |
| 25 | 104.9, 117.0 |

TABLE 2

Lengths to Avoid

| Frequency (MHz) | Lengths to Avoid (Inches) |
|---|---|
| 100 | 8.8, 12.6 |
| 85 | 11.2, 15.3 |
| 75 | 13.3, 17.6 |
| 66 | 15.5, 20.1 |
| 60 | 17.8, 22.6 |
| 33 | 36.0, 42.5 |
| 30 | 40.0, 47.5 |
| 25 | 49.8, 57.5 |

Figure 23:
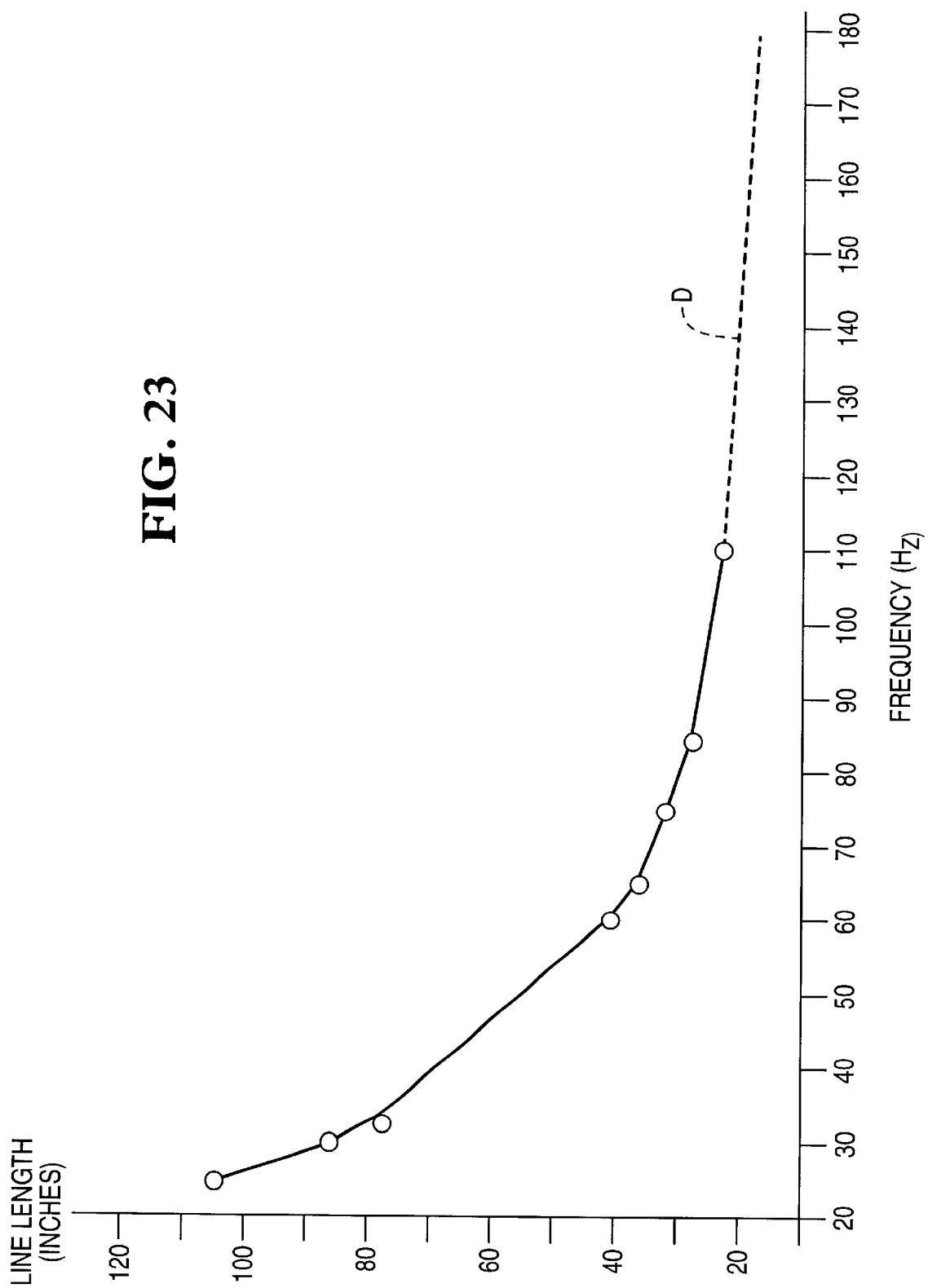
FIG. 23 is a plot, illustrating extrapolation of line lengths, for higher frequencies.

Lengths for other frequencies can be computed using the equations given above. Alternately, the length can be computed using the data of Table 1. For example, a curve can be plotted, as in FIG. 23, wherein section D is an extrapolation of the data points taken from the Tables. For the frequency used, the required length is found, using the curve. Of course, an actual graphical plot is not necessary; mathematical curve-fitting techniques can be used, based on the data of Table 1.

Numerous substitutions and modifications can be undertaken without departing from the true spirit and scope of the invention. What is desires to be secured by Letters Patent is the invention as defined by the following claims.

What is claimed is:

1. A digital apparatus, comprising:
   a) a clocked device, having a clock input for receiving clock signals having a wavelength L, at 50 MHz or above;
   b) a transmission line, connected to the clock input, of length 0.5*K*L, wherein K is a constant, of unity or greater.

2. Apparatus according to claim 1, wherein K is 1.00±0.005.

3. Apparatus according to claim 1, wherein K is 1.05±0.005.

4. Apparatus according to claim 1, wherein K is 1.10±0.005.

5. Apparatus according to claim 1, wherein K is an integer multiplied by 1.05.

6. A system, comprising:
   a) a device, having
      i) an input for receiving clock signals of frequency f, and
      ii) an input impedance Z at frequency f;
   b) a transmission line, connected to the device, having a reflected impedance at its other end greater than Z.

7. System according to claim 6, wherein the algebraic sign of the reflected impedance is the same as that of Z.

8. System according to claim 6, and further comprising a clock connected to said end.

9. System according to claim 6, and further comprising:
   a) a plurality of additional devices, each one of said plurality of additional devices having
      i) an input for receiving clock signals of frequency f, and
      ii) an input impedance Z at frequency f;
      iii) a transmission line, connected to each one of said plurality of additional devices, having a refelected impedance at its other end greater than Z;
   wherein all transmission lines are of substantially the same physical length.

10. A digital apparatus, comprising:
    a) a clock running at 66 MHz;
    b) one or more clocked devices having a total input capacitance of about 16 pico-Farads; and
    c) a transmission line, 36±0.5 inches long, connecting the clock and the clocked device.

11. A method of finding a length of transmission line to match a clocked device to a clock, comprising the following steps:
    a) ascertaining the following parameters:
       i) phase constant, β, of the transmission line, for the clock frequency;
       ii) characteristic impedance, $Z_0$ of the transmission line; and
       iii) lumped impedance, $Z_L$, of the clocked device; and
    b) based on said parameters, finding a length x which produces a predetermined reflected impedance, using the following expression:

$$Z(-x) = Z_0 \frac{Z_L \cos(\beta x) + jZ_0 \sin(\beta x)}{Z_0 \cos(\beta x) + jZ_L \sin(\beta x)}$$

12. Method according to claim 11, wherein said predetermined reflected impedance equals, or exceeds, said lumped impedance.

13. A digital apparatus, comprising:
    a) a clocked device, having a clock input for receiving clock signals at a frequency f above 60 MHz; and b) a transmission line of length L, connected to the clock input, such that the frequency f and the length L are selected from the following pairs of data points, which pairs follow the format (f, L):
(100, 22.6),
(85, 27.3),
(75, 31.6),
(66, 36.2),
(60, 40.7), and
(33, 77.4).

14. A digital apparatus, comprising:

a) a clocked device, having a clock input for receiving clock signals at a frequency f above 60 MHz; and b) a transmission line of length L, connected to the clock input, such that the frequency f and the length L are selected from the following pairs of data points, which pairs follow the format (f, L):
(100, 27.5),
(85, 33.0),
(75, 37.5),
(66, 43.0),
(60, 47.0),
(33, 88.0),
(30, 97.0), and
(25, 117.0).

* * * * *